(12) United States Patent
Higuchi (10) Patent No.: US 8,116,012 B2
(45) Date of Patent: Feb. 14, 2012

(54) MAGNETIC DEVICE AND LENS DRIVE DEVICE

(75) Inventor: Daisuke Higuchi, Nagano (JP)

(73) Assignee: Nidec Sankyo Corporation (JP)

( * ) Notice: Subject to any disclaimer, the term of this patent is extended or adjusted under 35 U.S.C. 154(b) by 337 days.

(21) Appl. No.: 12/555,755

(22) Filed: Sep. 8, 2009

(65) Prior Publication Data

US 2010/0060999 A1    Mar. 11, 2010

(30) Foreign Application Priority Data

Sep. 8, 2008   (JP) ................................. 2008-229696

(51) Int. Cl.
*G02B 15/14*   (2006.01)
(52) U.S. Cl. ........................................ 359/704; 359/696
(58) Field of Classification Search .................. 359/696, 359/704
See application file for complete search history.

(56) References Cited

U.S. PATENT DOCUMENTS

2009/0022487 A1*   1/2009   Weng et al. ................... 396/133

FOREIGN PATENT DOCUMENTS

JP   2006-259032 A   9/2006

* cited by examiner

*Primary Examiner* — Joseph P Martinez
(74) *Attorney, Agent, or Firm* — Cantor Colburn LLP (57) ABSTRACT

A magnetic device may include a coil wound body having a first coil winding face and a second coil winding face in an axial direction, a coil wound around the first coil winding face and the second coil winding face, and a coil winding start part and a coil winding end part arranged on an opposite side to the second coil winding face with respect to the first coil winding face. The coil is wound around the first coil winding face by an odd number of layer(s) from the winding start part and then the coil is wound around the second coil winding face by an even number of layers in a reverse direction to the first coil winding face, and then the coil is wound around the first coil winding face by an odd number of layer(s) in a reverse direction to the second coil winding face. The magnetic device may be used in a lens drive device in which the coil wound body is a movable body having a lens.

20 Claims, 8 Drawing Sheets

MAGNETIC DEVICE AND LENS DRIVE DEVICE

CROSS REFERENCE TO RELATED APPLICATION

The present invention claims priority under 35 U.S.C. §119 to Japanese Application No. 2008-229696 filed Sep. 8, 2008, the entire contents of which are incorporated herein by reference.

FIELD OF THE INVENTION

At least an embodiment of the present invention may relate to a magnetic device which includes a coil wound body in which a coil is wound around a first coil winding face and a second coil winding face which are adjacent to each other in an axial direction, and to a lens drive device in which the magnetic device is used as a drive mechanism.

BACKGROUND OF THE INVENTION

A lens drive device which is mounted on a cell phone with a camera or mounted on a digital camera may include a support body, a movable body having a lens, a magnetic drive mechanism for magnetically driving the movable body in an optical axis direction of the lens, and a spring member which is connected between the support body and the movable body. The movable body is driven in the optical axis direction by utilizing a thrust force of the magnetic drive mechanism and an urging force of the spring member. In the lens drive device, the drive mechanism is structured as a magnetic drive mechanism (magnetic device) which includes a coil wound around the movable body and a magnet held by the support body.

In the magnetic drive mechanism which is structured as described above, a structure has been proposed in which a first coil winding face and a second coil winding face are formed on an outer peripheral face of the movable body so as to be adjacent to each other in an axial direction and a coil is wound around the first coil winding face and the second coil winding face in reverse directions (see Japanese Patent Laid-Open No. 2006-259032).

However, like the above-mentioned Patent Reference, when a coil is wound around the first coil winding face and the second coil winding face on the outer peripheral face of the movable body which are adjacent to each other in the axial direction, a jumper wire crossing the first coil winding face or the second coil winding face is formed. The jumper wire does not generate any thrust force and, in addition, the jumper wire increases the outer diameter dimension of the magnetic device.

SUMMARY OF THE INVENTION

In view of the problems described above, at least an embodiment of the present invention may advantageously provide a magnetic device in which a jumper wire crossing the first coil winding face or the second coil winding face is not formed even when a coil is wound around the first coil winding face and the second coil winding face, and provide a lens drive device in which the magnetic device is used as a drive mechanism.

According to at least an embodiment of the present invention, there may be provided a magnetic device including a coil wound body which is formed on an outer peripheral face with a first coil winding face and a second coil winding face adjacent to the first coil winding face in an axial direction, a coil which is wound around the first coil winding face and the second coil winding face, and a coil winding start part and a coil winding end part which are provided on an opposite side to the second coil winding face with respect to the first coil winding face. The coil is wound around the first coil winding face by an odd number of layer(s) from the winding start part and then the coil is wound around the second coil winding face by an even number of layers in a reverse direction to the first coil winding face, and then the coil is wound around the first coil winding face by an odd number of layer(s) in a reverse direction to the second coil winding face and then the coil is drawn outside from the coil winding end part.

In accordance with at least an embodiment of the present invention, the winding order and the winding layers of the coil wire are optimized in the first coil winding face and the second coil winding face and thus a jumper wire crossing the first coil winding face or the second coil winding face is not formed. Therefore, an outer diameter portion where the conventional jumper wire occupies is utilized as a winding portion of the coil and thus the number of wound layers of the coil can be increased without increasing the outer diameter dimension.

In accordance with at least an embodiment of the present invention, a coil engaging part is formed between the first coil winding face and the second coil winding face for turning a winding direction of the coil in a reverse direction, and the coil is regularly wound around the first coil winding face and the second coil winding face. According to this structure, a winding number of the coil can be increased without increasing the outer diameter dimension.

In accordance with at least an embodiment of the present invention, a protruded part is formed in a rib-like shape for dividing the outer peripheral face of the coil wound body into the first coil winding face and the second coil winding face and the coil engaging part is an end part of a cut-out portion which is formed in the protruded part. Further, in accordance with an embodiment of the present invention, a movable body includes the coil wound body and is driven in the axial direction, and a support body is disposed on an outer side of the coil wound body for supporting the coil wound body to be capable of moving in the axial direction. The protruded part is formed also as an interference projecting part to the support body for restricting at least one of a turning range of the movable body and a moving range of the movable body in a direction perpendicular to the axial direction.

In accordance with at least an embodiment of the present invention, an outer diameter dimension of the first coil winding face is different from an outer diameter dimension of the second coil winding face and, in the first coil winding face and the second coil winding face, a length in the axial direction of a winding face whose outer diameter dimension is larger is set to be longer than a length in the axial direction of a winding face whose outer diameter dimension is smaller, and the winding face whose outer diameter dimension is smaller is provided with a larger number of layers of coil winding than the winding face whose outer diameter dimension is larger. According to this structure, the number of wound layers of the coil wire can be increased without increasing the maximum outer diameter dimension of the entire coil wound body including the coil.

In accordance with at least an embodiment of the present invention, the winding face whose outer diameter dimension is smaller is provided with a larger number of layers of coil winding than the winding face whose outer diameter dimension is larger, and a number of layers of coil winding of the winding face whose outer diameter dimension is smaller is determined according to a difference of the outer diameter dimensions and a difference of the lengths in the axial direction of the winding faces. In other words, suitable values are determined according to an adaptable number of layers of coil winding, an adaptable difference of the outer diameter dimensions and an adaptable difference in the axial direction. According to this structure, the outer diameter dimension of the coil wound body including the coil can be set so that a portion corresponding to the first coil winding face and a portion corresponding to the second coil winding face are substantially equal to each other. Therefore, the number of wound layers of the coil wire can be increased without increasing the maximum outer diameter dimension of the entire coil wound body including the coil.

The present invention is effectively applied to an embodiment that both of numbers of layers of coil winding around the first coil winding face and the second coil winding face are eight or less. As the number of layers of coil winding is smaller, the effect utilizing the space occupied by the conventional jumper wire becomes larger. Especially, when the present invention is applied to a case that the number of layers of coil winding is eight or less, the number of layers of coil winding is increased by 10% or more.

In accordance with at least an embodiment of the present invention, a diameter of a coil wire of the coil is in a range from 0.04 mm to 0.08 mm including winding insulation layer. When a diameter of a coil wire of the coil is thinner, the coil wire is easily disconnected at a portion of the jumper wire. However, according to this embodiment of the present invention, no jumper wire is formed and thus disconnection of the coil wire caused by the jumper wire does not occur during winding.

In accordance with at least an embodiment of the present invention, the coil winding start part and the coil winding end part are located on opposite sides to each other in the coil wound body so as to interpose an axial line between the coil winding start part and the coil winding end part. According to this structure, a symmetric property of the coil wound body can be secured in comparison with a case that the coil winding start part and the coil winding end part are adjacent to each other in the circumferential direction.

The magnetic device to which the present invention is applied may be used in a lens drive device. In the lens drive device, the coil wound body is a movable body which holds a lens and the movable body is driven in an optical axis direction of the lens by supplying an electric current to the coil.

Specifically, according to at least an embodiment of the present invention, there may be provided a lens drive device including a support body, a movable body which includes a lens, and a magnetic drive mechanism which includes a magnet on the support body and a coil on the movable body for magnetically driving the movable body along a lens optical axis direction toward an object to be photographed side and toward an opposite side to the object to be photographed side. The movable body is formed on an outer peripheral face with a first coil winding face and a second coil winding face which is adjacent to the first coil winding face in an axial direction, and the movable body includes a coil which is wound around the first coil winding face and the second coil winding face, and the movable body includes a coil winding start part and a coil winding end part which are arranged on the opposite side to the object to be photographed side with respect to the first coil winding face. In addition, the coil is wound around the first coil winding face by an odd number of layer(s) from the winding start part and then the coil is wound around the second coil winding face by an even number of layers in a reverse direction to the first coil winding face, and then the coil is wound around the first coil winding face by an odd number of layer(s) in a reverse direction to the second coil winding face and then the coil is drawn outside from the coil winding end part.

As described above, in accordance with the embodiment of the present invention, the winding order and the winding layers of the coil wire are optimized in the first coil winding face and the second coil winding face and thus a jumper wire crossing the first coil winding face or the second coil winding face is not formed. Therefore, an outer diameter portion where the conventional jumper wire occupies is utilized for winding of the coil and thus the number of wound layers of the coil can be increased without increasing the outer diameter dimension.

In the lens drive device described above, it is preferable that the magnetic drive mechanism includes a first coil which is wound around the first coil winding face, a second coil which is wound around the second coil winding face, and two magnets which are divided in an optical axis direction so as to face outer peripheral sides of the first coil and the second coil, and the two magnets are magnetized so that poles of inner faces are different from each other. According to this structure, when an electric current is supplied to the first coil and the second coil, the first coil 31 and the second coil 32 are respectively received with electromagnetic forces in the same direction.

In the lens drive device described above, it is preferable that the support body includes a yoke which is formed in a substantially rectangular parallelepiped shape, and the magnets divided in the optical axis direction are fixed to four corner portions on an inner peripheral face of the yoke in a separated state in a circumferential direction. According to this structure, spaces of four corners between the movable body and the yoke are utilized as arrangement spaces of the magnets and thus the size of the lens drive device can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1(*a*) is an outward appearance view showing a lens drive device in accordance with an embodiment of the present invention which is viewed from obliquely above, and FIG. 1(*b*) is its exploded perspective view.

FIG. 4(*a*) is a sectional view showing a state where a first coil and a second coil are wound around a sleeve in a lens drive device in accordance with an embodiment of the present invention, FIG. 4(*b*) is a perspective view showing the sleeve, FIG. 4(*c*) is a perspective view showing the sleeve which is viewed from the opposite side, and FIG. 4(*d*) is a plan view showing the sleeve.

DETAILED DESCRIPTION OF THE PREFERRED EMBODIMENTS

An embodiment of the present invention will be described below with reference to the accompanying drawings. A lens drive device which will be described below is capable of being mounted on various electronic apparatuses in addition to a cell phone with a camera. For example, the lens drive device may be mounted on a thin-type digital camera, a PHS, a PDA, a bar code reader, a monitoring camera, a camera for rear confirmation in a car, a door having optical authentication function or the like or any other device.

Figures 1A, 1B:
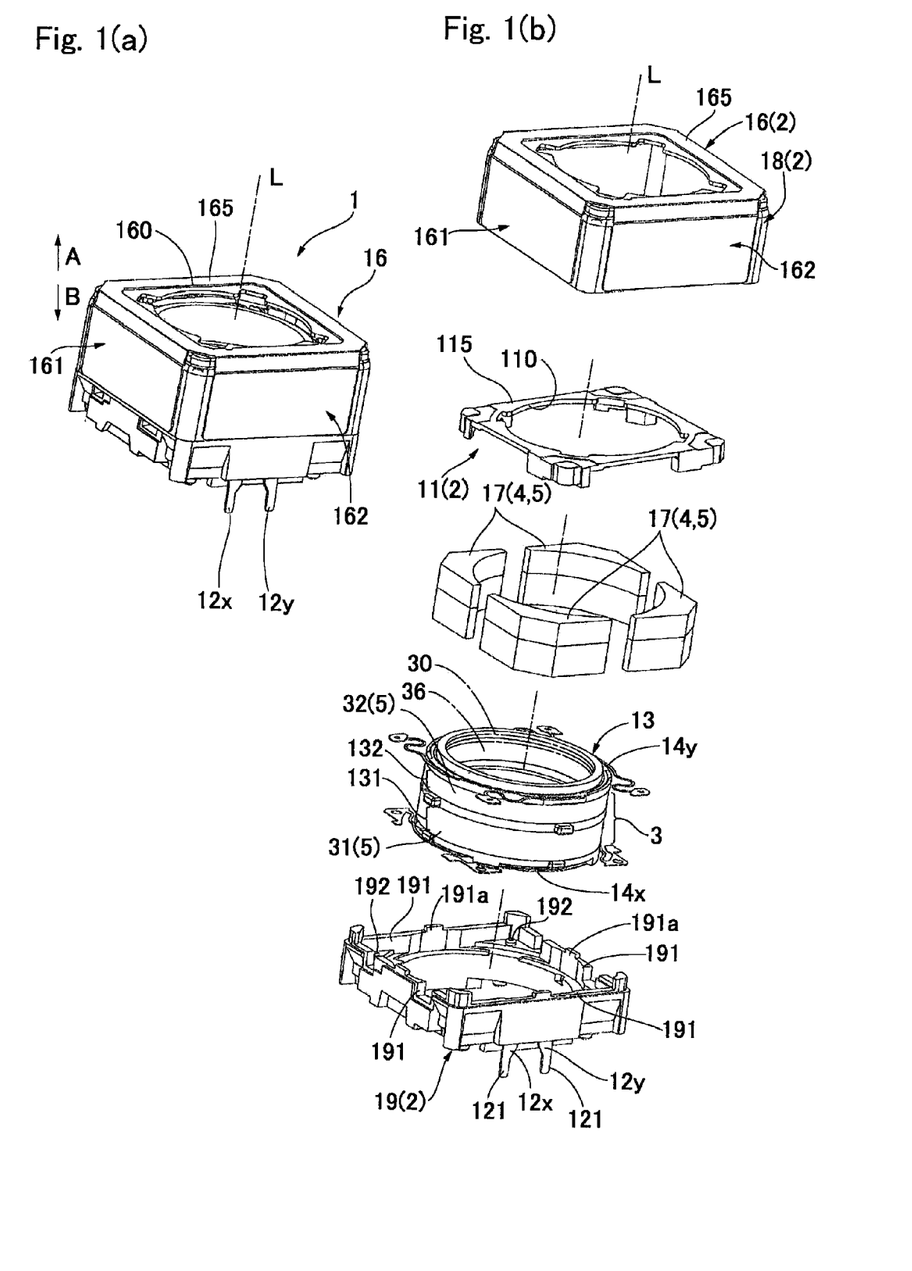
Figure 2:
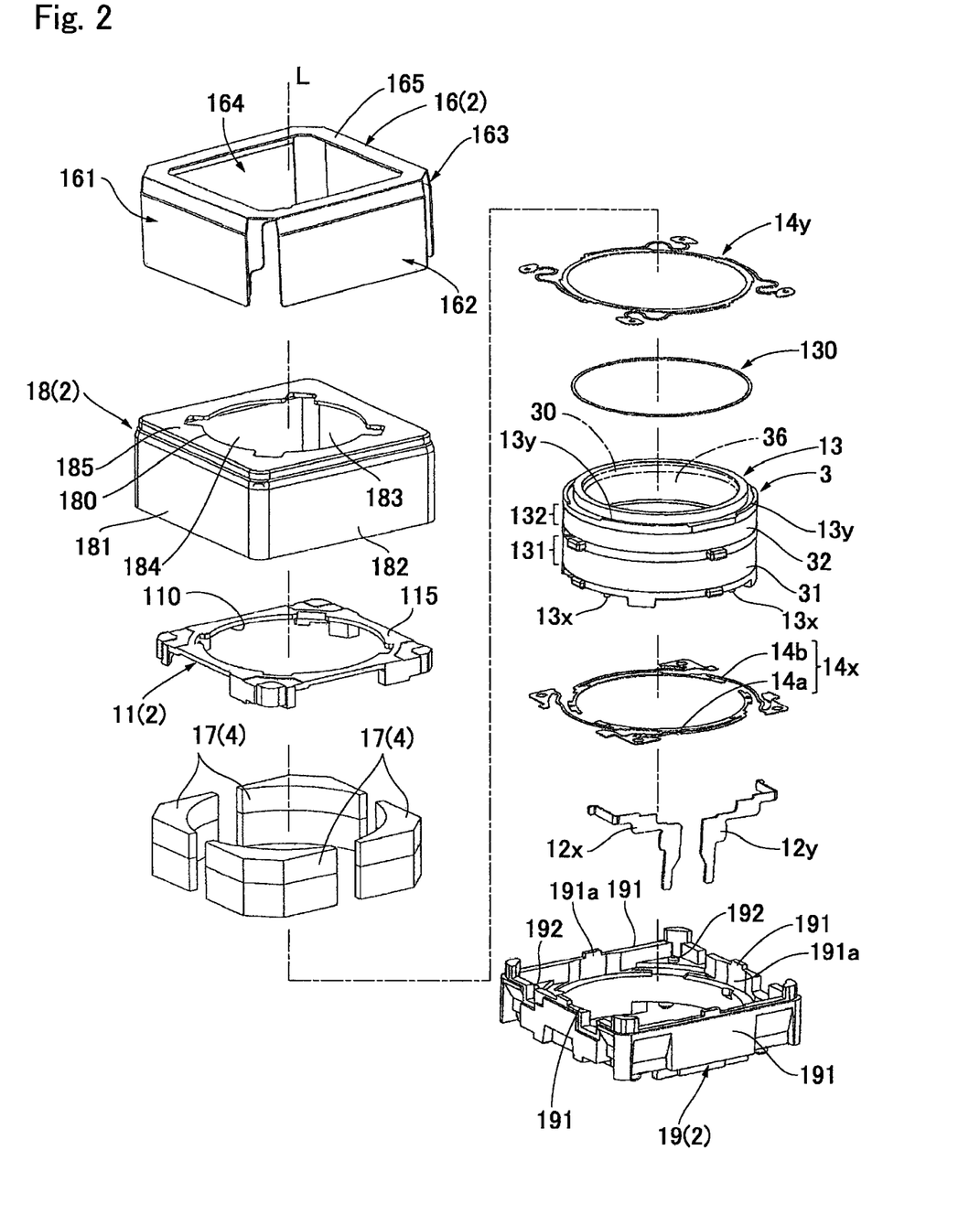
FIG. 2 is a detail exploded perspective view showing a lens drive device in accordance with an embodiment of the present invention.
Figure 3:
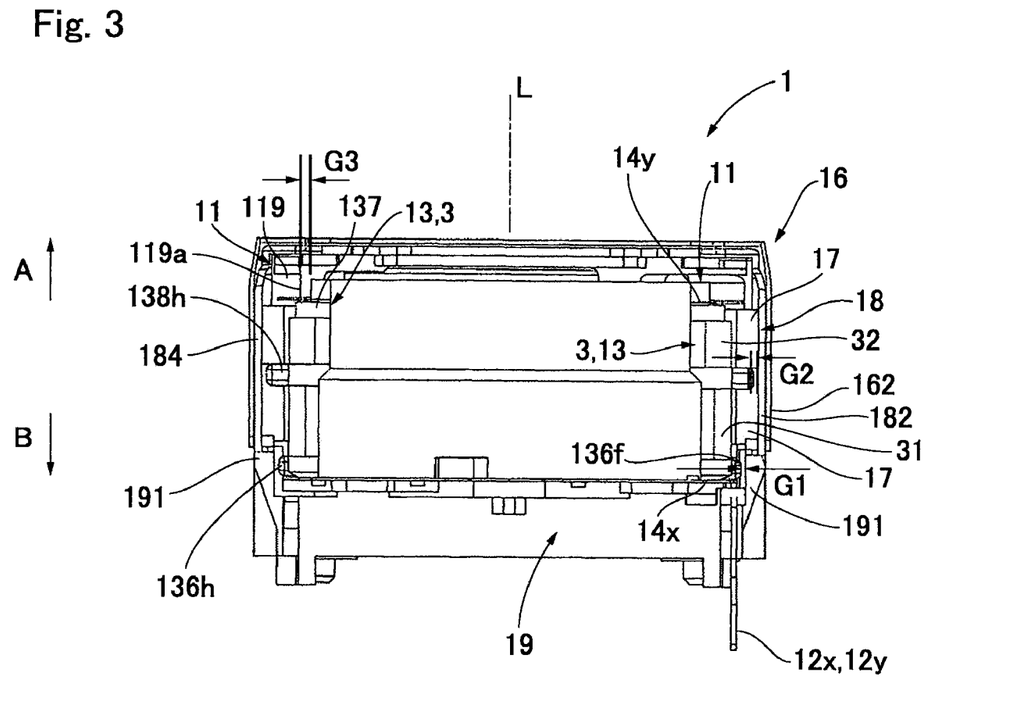
FIG. 3 is an explanatory view schematically showing an operation of a lens drive device in accordance with an embodiment of the present invention.

FIG. 1(a) is an outward appearance view showing a lens drive device in accordance with an embodiment of the present invention which is viewed from obliquely above, and FIG. 1(b) is its exploded perspective view. FIG. 2 is a detail exploded perspective view showing the lens drive device, which is separated in more detail than the state shown in FIG. 1(b), in accordance with an embodiment of the present invention. FIG. 3 is an explanatory view schematically showing an operation of a lens drive device in accordance with an embodiment of the present invention. In FIG. 3, a lens and a lens holder are not shown.

In FIGS. 1(a), 1(b), 2 and 3, a lens drive device 1 in this embodiment is structured so that a lens 36 and a diaphragm are moved along an optical axis direction "L" (lens optical axis direction/thrust direction) in both of an "A"-direction (front side) toward an object to be photographed (object side) and a "B"-direction (rear side) toward an opposite side (image side) to the object to be photographed in a thin camera which is used in a cell phone with a camera. The lens drive device 1 is formed in a substantially rectangular parallelepiped shape. The lens drive device 1 includes a movable body 3, which is provided with a cylindrical lens holder 30 generally having one or plural pieces of lenses 36 and a fixed diaphragm in its inside, a magnetic drive mechanism 5 for moving the movable body 3 along the optical axis direction "L", and a support body 2 on which the magnetic drive mechanism 5, the movable body 3 and the like are mounted. The movable body 3 includes a sleeve 13 formed in a cylindrical shape and a lens holder 30 formed in a cylindrical shape is fixed on its inside. Therefore, an outward shape of the movable body 3 is determined by the sleeve 13 and formed in a roughly circular cylindrical shape. The lens drive device 1 is regarded as a magnetic device which is provided with the magnetic drive mechanism 5.

In this embodiment, the movable body 3 includes three pieces of lens 36, which are disposed at both ends in an optical axis direction of the movable body and at a roughly center position of the movable body. A diameter of a lens disposed on an imaging element side is larger than diameters of other lenses. Therefore, a center of gravity of the movable body 3 is located on one side in the lens optical axis direction with respect to the center position of the movable body 3, in this embodiment, at a position shifted toward the imaging element side.

The support body 2 includes a holder 19 (insulation member) made of a rectangular resin plate for holding an imaging element (not shown) on an image side, and also includes a cap 16, a box-shaped yoke 18 and a spacer 11 on an object to be photographed side. Center portions of the spacer 11, the cap 16 and the yoke 18 are respectively formed with circular incident windows 110, 160 and 180 for taking light from an object to be photographed into the lens 36. The yoke 18 is structured of a ferromagnetic plate such as a steel plate. As described below, together with a magnet 17, the yoke 18 structures an interlinkage magnetic field generating body 4 for generating an interlinkage magnetic field in a first coil 31 and a second coil 32 which are held by the sleeve 13.

The cap 16 is a metal press-worked product provided with a top plate part 165 and four side plate parts 161, 162, 163 and 164, which are bent toward the imaging element side from the top plate part 165. The side plate parts 161, 162, 163 and 164 are extended with a roughly same width dimension as side parts of the top plate part 165.

The magnetic drive mechanism 5 includes the first coil 31 and the second coil 32, which are wound around an outer peripheral face of the sleeve 13, and the interlinkage magnetic field generating body 4 for generating an interlinkage magnetic field in the first coil 31 and the second coil 32. The magnetic drive mechanism 5 is structured of the first coil 31, the second coil 32 and the interlinkage magnetic field generating body 4. The interlinkage magnetic field generating body 4 includes four magnets 17 which are faced with the first coil 31 and the second coil 32 on their outer peripheral sides. Further, the yoke 18 is also used as a structural component of the magnetic drive mechanism 5.

The yoke 18 is formed in a box-like shape provided with a top plate part 185, which covers an upper face side of the second coil 32 located on an object to be photographed side, and side plate parts 181, 182, 183 and 184 which cover side faces of the first coil 31 and the second coil 32. The yoke 18 reduces leakage flux from a magnetic path structured between the magnets 17 and the first coil 31 and the second coil 32. According to this structure, linearity between a moving amount of the movable body 3 and an electric current supplied to the first coil 31 and the second coil 32 can be improved.

In this embodiment, each of the four magnets 17 is formed in a roughly triangular prism shape and the four magnets 17 are fixed at four corner portions of the inner peripheral face of the yoke 18 in a separated state in the circumferential direction. Each of the four magnets 17 is divided into two pieces in the optical axis direction "L" and is magnetized so that its inside face and its outside face are magnetized to be different from each other. The four magnets 17 are, for example, magnetized so that inside faces of their upper half portions are magnetized to be an "N"-pole and their outside faces are magnetized to be an "S"-pole, and are magnetized so that inside faces of their lower half portions are magnetized to be an "S"-pole and their outside faces are magnetized to be an "N"-pole. Therefore, winding directions of a coil wire for the first coil 31 and the second coil 32 are opposite to each other. In a case that the magnet 17 is divided and disposed at four corners as described above, even when a space between the yoke 18 and the sleeve 13 becomes narrow at a center portion of a side part of the yoke 18, the magnet 17 is prevented from being provided with a very thin portion and thus the strength of the magnet 17 can be enhanced. Further, a magnetic force of the magnet 17 can be efficiently applied to the first coil 31 and the second coil 32 which are mounted on the movable body 3. In addition, since spaces at the four corners between the movable body 3 and the yoke 18 are efficiently utilized as an arrangement space of the magnet 17, the entire size of the lens drive device 1 can be reduced.

The lens drive device 1 in this embodiment includes a first spring member 14x and a second spring member 14y which are disposed between the holder 19 and the sleeve 13 (imaging element side) and between the spacer 11 and the sleeve 13 (object to be photographed side) so as to be connected with the support body 2 and the movable body 3. Each of the first spring member 14x and the second spring member 14y is made of metal such as beryllium copper or SUS steel material and is formed by means of that a thin plate having an appropriate thickness is performed by press working or etching processing using photo lithography technique.

Detailed structures of the first spring member 14x and the second spring member 14y will be described below. The first spring member 14x is connected with the holder 19 and the sleeve 13 and the movable body 3 is set to be in a supported state by the support body 2 so as to be capable of moving along the optical axis of the lens. Further, the second spring member 14y is connected with the spacer 11 and the sleeve 13 and the movable body 3 is set to be in a supported state by the support body 2 so as to be capable of moving along the optical axis of the lens.

The first spring member 14x which is disposed on the holder 19 side is divided into two pieces, i.e., two spring pieces 14a and 14b. As specifically described below, two end parts (winding start and winding end) of the first coil 31 and the second coil 32 are connected with the spring pieces 14a and 14b. Therefore, the first spring member 14x (spring pieces 14a and 14b) functions also as a power supply member to the first coil 31 and the second coil 32.

The spring pieces 14a and 14b may be applied with bending work and drawn to outside of the support body 2 to be utilized to electrically connect with the outside. However, in this embodiment, the terminals 12x and 12y separately formed from the spring pieces 14a and 14b and the yoke 18 are fixed to the holder 19.

In this embodiment, the magnetic drive mechanism 5 further includes a ring-shaped magnetic piece 130, which is held on the upper end of the sleeve 13. The magnetic piece 130 applies an urging force in the optical axis direction "L" to the movable body 3 by an attraction force acting between the magnets 17 and the magnetic piece 130. Therefore, the movable body 3 is prevented from displacing due to its own weight at the time of no energization and thus the movable body 3 is maintained in a desired posture and its impact resistance can be improved. Further, since the magnetic piece 130 acts as a back yoke, leakage flux from the magnetic path structured between the magnets 17 and the first coil 31 and the second coil 32 is reduced. In accordance with an embodiment of the present invention, a magnetic member in a bar-like shape may be used as the magnetic piece.

The spacer 11 is attached to an inside face of the top plate part 185 of the yoke 18 and an incident window 110 is formed at its center portion. Four corners of the plate part 115 are formed with a small projection 112 (see FIG. 6) which is protruded toward an opposite side to the object to be photographed side.

Four corners of the holder 19 are formed with a small projection 192 extending toward the object to be photographed side. The small projections 192 of the holder 19 and the small projections 112 of the spacer 11 are respectively used when the first spring member 14x and the second spring member 14y are connected with the support body 2.

An upper end face of the sleeve 13 (end face on the object to be photographed side) is formed in the circumferential direction with a plurality of step-shaped protruded parts 13y for connecting the second spring member 14y. A lower end face of the sleeve 13 (end face on the imaging element side) is formed with a plurality of small projections 13x for connecting the first spring member 14x in the circumferential direction.

In the lens drive device 1 in this embodiment, the movable body 3 is normally located on the imaging element side (image side). In this state, when an electric current is supplied to the first coil 31 and the second coil 32 in a predetermined direction, an upward (front side) electromagnetic force is applied to the first coil 31 and the second coil 32 respectively. Therefore, the sleeve 13 to which the first coil 31 and the second coil 32 are fixed begins to move toward the object side (front side/direction shown by the arrow "A"). In this case, elastic forces which restrict movement of the sleeve 13 are respectively occurred between the second spring member 14y and the front end of the sleeve 13 and between the first spring member 14x and the rear end of the sleeve 13. Therefore, the sleeve 13 stops when the electromagnetic force moving the sleeve 13 toward the front side and the elastic force restricting the movement of the sleeve 13 are balanced with each other. In this case, when an amount of the electric current supplied to the first coil 31 and the second coil 32 is adjusted according to the elastic force acting on the sleeve 13 by the first spring member 14x and the second spring member 14y, the sleeve 13 (movable body 3) can be stopped at a desired position.

In this embodiment, a flat spring (gimbal spring), which is provided with a linear relationship between an elastic force (stress) and displacement amount (distorsion amount), is used as the first spring member 14x and the second spring member 14y. Therefore, linearity between a moving amount of the sleeve 13 and an electric current supplied to the first coil 31 and the second coil 32 can be improved. Further, two spring members comprised of the first spring member 14x and the second spring member 14y are used and thus, when the sleeve 13 is stopped, large balanced forces are applied in the optical axis direction. Therefore, even when a centrifugal force, an impact force or the like is acted in the optical axis direction, the sleeve 13 can be stopped further stably. In addition, in order to stop the sleeve 13 in the lens drive device 1, instead of making the sleeve 13 collide with a collided member (buffer material), in this embodiment, the sleeve 13 is stopped by utilizing the electromagnetic force and the elastic force and thus a collision noise can be prevented.

Figure 4A:
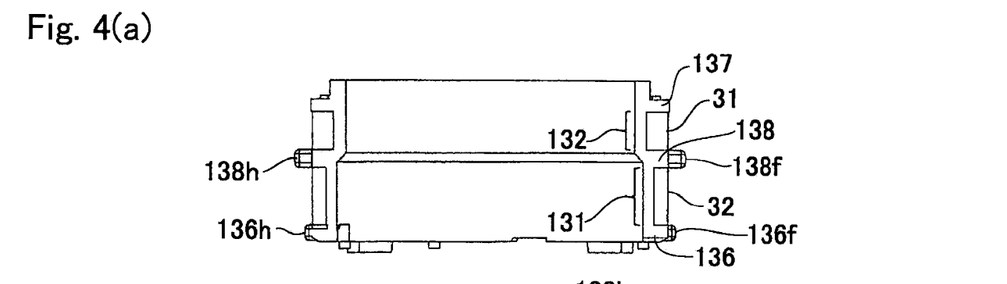
Figure 4B:
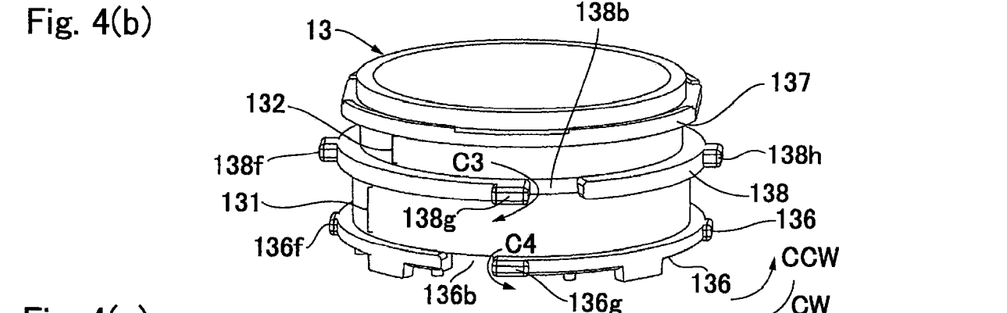
Figure 4C:
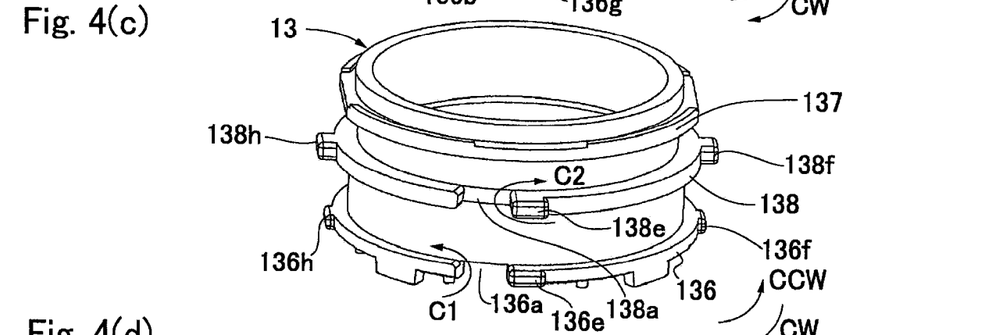
Figure 4D:
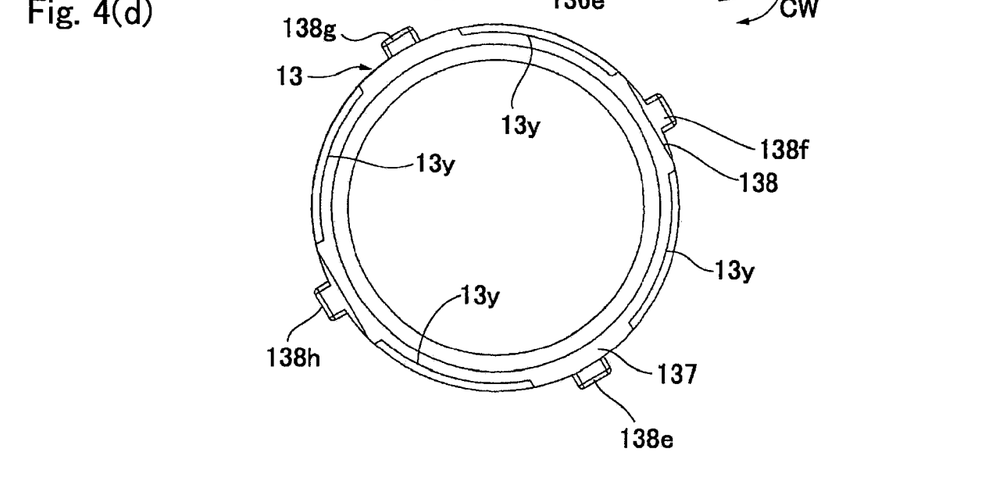

FIG. 4(a) is a sectional view showing a state where the first coil 31 and the second coil 32 are wound around the sleeve 13 in the lens drive device 1 in accordance with an embodiment of the present invention, FIG. 4(b) is a perspective view showing the sleeve 13, FIG. 4(c) is a perspective view showing the sleeve 13 which is viewed from the opposite side, and FIG. 4(d) is a plan view showing the sleeve 13.

As described with reference to FIGS. 1(a) through 3, the sleeve 13 is a coil wound body in which the first coil 31 and the second coil 32 are wound around its outer peripheral face and winding directions of a coil wire of the first coil 31 and the second coil 32 are opposite to each other. In order to obtain this structure, in this embodiment, the outer peripheral face of the sleeve 13 is formed with rib-shaped protruded parts 136 and 137 formed in a ring shape at an imaging element side end part and an object side end part. Further, the outer peripheral face of the sleeve 13 is formed with a rib-shaped protruded part 138 formed in a ring shape at a position slightly shifted toward the object to be photographed side with respect to the middle position between the rib-shaped protruded parts 136 and 137. Therefore, a first coil winding face 131 is formed between the rib-shaped protruded parts 136 and 138 on the outer peripheral face of the sleeve 13, and a second coil winding face 132 is formed between the rib-shaped protruded parts 137 and 138. A width dimension in the optical axis direction "L" (distance between the rib-shaped protruded parts, i.e., length in the axial direction) of the second coil winding face 132 is narrower than that of the first coil winding face 131, and its outer diameter dimension is smaller than that of the first coil winding face 131.

The rib-shaped protruded part 137 which is formed at the object side end part is continuously formed in the circumferential direction. On the other hand, the rib-shaped protruded part 136 on the imaging element side is formed with a pair of cut-out portions at positions opposite to each other across the optical axis. One of a pair of the cut-out portions is utilized as a coil winding start part 136a and the other cut-out portion is utilized as a coil winding end part 136b. The rib-shaped protruded part 136 is formed with projections 136e, 136f, 136g and 136h protruded toward outer peripheral side with equal angular distances, and the projections 136e and 136g are respectively formed on a counter-clockwise CCW side so as to be adjacent to the coil winding start part 136a and the coil winding end part 136b.

The rib-shaped protruded part 138 disposed at the middle position is formed with a pair of cut-out portions at positions opposite to each other across the optical axis. A pair of the cut-out portions is utilized so that a winding position of the coil wire is changed between the first coil winding face 131 and the second coil winding face 132 and is utilized also as coil turning parts 138a and 138b for reversing a winding direction of the coil wire. The rib-shaped protruded part 138 is formed with projections 138e, 138f, 138g and 138h which are protruded toward outer peripheral side with equal angular distances. The projection 138e is adjacent to the coil turning part 138a on the counter-clockwise CCW direction side and the projection 138g is adjacent to the coil turning part 138b on the clockwise CW direction side. The projections 138e and 138g function as a coil engaging part for engaging the coil wire together with the end part of the rib-shaped protruded part 138 when the coil wire is turned through the turning parts 138a and 138b. The coil engaging part may be formed as a projection which is protruded outside in the radial direction from the outer peripheral face of the sleeve 13. For example, when the projections 138e and 138g are not formed, in the rib-shaped protruded part 138 for separating the first coil winding face 131 and the second coil winding face 132 from each other, an end part of the rib-shaped protruded part 138 formed through the cut-out portion may be utilized as the coil engaging part.

The projections 138e, 138f, 138g and 138h which are formed at the middle position on the sleeve 13 structured as described above are protruded on an outer side in the radial direction in comparison with the projections 136e, 136f, 136g and 136h formed on the imaging element side. As described below, the projections 138e through 138h are located between the magnets 17 disposed to be adjacent in the circumferential direction. Further, the projections 136e through 136h formed on the outer peripheral face of the sleeve 13 are located on inner sides of the recessed parts 191a which are formed on an inner face of the side wall part 191 of the holder 19. Therefore, the projections 138e, 138f, 138g and 138h disposed at the middle positions and the projections 136e, 136f, 136g and 136h disposed on the imaging element side function also as an interference projecting part for restricting a turning range of the movable body 3 or for restricting a moving range in the radial direction of the movable body 3.

In the sleeve 13 in this embodiment, an outer diameter dimension of the first coil winding face 131 is different from that of the second coil winding face 132, and the outer diameter dimension of the second coil winding face 132 is smaller than the outer diameter dimension of the first coil winding face 131. In other words, a plurality of lenses 36 is held on the inside of the sleeve 13 through the lens holder 30 and a lens located on the imaging element side is set to be larger than that located on the object to be photographed side according to increase of pixel number. Therefore, the outer diameter dimension of the lens holder 30 is set to be smaller on the object to be photographed side than that on the imaging element side and thus an inner diameter dimension of the sleeve 13 is set to be smaller on the object to be photographed side than that on the imaging element side. Accordingly, an outer diameter dimension of the second coil winding face 132 is set to be smaller than that of the first coil winding face 131. Further, a length in the optical axis direction "L", i.e., in the axial direction of the second coil winding face 132 is set to be shorter than that of the first coil winding face 131.

In order to wind a coil wire around the sleeve 13, in this embodiment, first, as shown by the arrow C1, the coil wire is wound around the first coil winding face 131 from the winding start part 136a in a clockwise direction CW by an odd number of layers (for example, three layers). As a result, an end of the coil wire is located near the coil turning part 138a and thus, as shown by the arrow C2, a winding direction of the coil wire is reversed through a root portion of the projection 138e when the coil wire is passed through the coil turning part 138a. After that, the coil wire is wound around the second coil winding face 132 by an even number of layers (for example, eight layers) in the counter-clockwise direction CCW. In this case, the coil wire is reciprocated along the coil winding face 132 and thus an end of the coil wire reaches near the rib-shaped protruded part 138 disposed at the middle position. Next, as shown by the arrow C3, a winding direction of the coil wire is reversed through a root portion of the projection 138g when the coil wire is passed through the coil turning part 138b. After that, the coil wire is wound around the first coil winding face 131 by an odd number of layers (for example, three layers) in the clockwise direction CW. As a result, an end of the coil wire reaches near the rib-shaped protruded part 136 and thus, as shown by the arrow C4, the coil wire is drawn out from the coil winding end part 136b. The winding start part and the winding end part of the coil wire are connected with the spring pieces 14a and 14b of the first spring member 14x which are described with reference to FIGS. 1(a) and 1(b) and FIG. 2.

In this embodiment, the coil wire is, for example, wound around the first coil winding face 131 by three layers, and then the coil wire is wound around the second coil winding face 132 by eight layers and, after that, the coil wire is wound around the first coil winding face 131 by three layers again. However, the present invention is not limited to this embodiment. For example, it may be structured that the coil wire is wound around the first coil winding face 131 by one layer and then, the coil wire is wound around the second coil winding face 132 by four layers and, after that, the coil wire is wound around the first coil winding face 131 by one layer again. Alternatively, it may be structured that the coil wire is wound around the first coil winding face 131 by three layers and then, the coil wire is wound around the second coil winding face 132 by six layers and, after that, the coil wire is wound around the first coil winding face 131 by one layer again. The number of layers of coil winding may be determined in an appropriate value by taking the difference of the outer diameter dimensions and the difference in the axial direction of the first coil winding face 131 and the second coil winding face 132 and the relationship to the magnets 17 facing the first coil 31 and the second coil 32 into consideration.

In this embodiment, the coil wire is regularly wound around the first coil winding face 131 and the second coil winding face 132. Further, each of the numbers of layers of coil winding around the first coil winding face 131 and the second coil winding face 132 is eight or less, and a wire diameter of the coil wire is in a range of 0.04-0.08 mm including insulation layer.

Further, in this embodiment, the outer diameter dimension of the first coil winding face 131 is different from that of the second coil winding face 132, and the number of layers of coil winding around the winding face having a smaller outer diameter dimension is set to be larger than the winding face having a lager outer diameter dimension. In other words, in this embodiment, the number of layers of coil winding around the second coil winding face 132 having a smaller outer diameter dimension is set to be larger than that of the first coil winding face 131 having a larger outer diameter dimension. Especially in this embodiment, in the second coil winding face 132 having a smaller outer diameter dimension, the number of layers of coil winding is increased so as to correspond to a difference of the outer diameter dimension and a difference in the axial direction in comparison with the first coil winding face 131 having a larger outer diameter dimension.

As described above, each of the numbers of layers of coil winding around the first coil winding face 131 and the second coil winding face 132 is set to be eight or less. In this case, the number of layers of coil winding is restricted and thus it is preferable that the differences of the outer diameter dimensions and the lengths in the axial direction of the coil winding faces 131 and 132 are determined on the basis of the number of layers of the coil winding. However, the number of layers of coil winding may be set in more than eight layers and, in this case, the number of layers of the coil winding may be determined on the basis of the differences of the outer diameter dimensions and the lengths in the axial direction of the coil winding faces 131 and 132. In other words, the number of layers of coil winding, the difference of their outer diameter dimensions and the difference in the axial direction may be satisfactorily determined on the basis of their values that can be selected.

As an example of this embodiment, the number of layers of coil winding around the first coil winding face 131 whose outer diameter dimension is larger is six (six layers) and the number of layers of coil winding around the second coil winding face 132 whose outer diameter dimension is smaller is eight (eight layers). However, the length in the axial direction of the second coil winding face 132 is set to be shorter than that of the first coil winding face 131 and thus the winding number in the axial direction per one layer is smaller. Therefore, magnetic balance between the first coil winding face 131 and the second coil winding face 132 is totally obtained by appropriately setting the difference of their outer diameter dimensions and the difference in the axial direction. Accordingly, the outer diameter dimension of the sleeve 13 including the coil wire can be set so that a portion corresponding to the first coil winding face 131 and a portion corresponding to the second coil winding face 132 are equal to each other. As a result, the number of layers of the coil wire can be increased without increasing the maximum outer diameter dimension of the entire sleeve 13 including the first coil 31 and the second coil 32.

In this embodiment, based on the relationship of sizes of the lenses, the outer diameter dimension of the first coil winding face 131 is set to be larger than the outer diameter dimension of the second coil winding face 132. However, based on required design circumstances, the outer diameter dimension of the first coil winding face 131 may be set to be smaller than the outer diameter dimension of the second coil winding face 132. In this case, the number of layers of coil winding around the first coil winding face 131 whose outer diameter dimension is smaller is set to be larger.

As described above, in this embodiment, the winding order and the number of wound layers of the coil wire are optimized in the first coil winding face 131 and the second coil winding face 132 and thus a jumper wire crossing the first coil winding face 131 or the second coil winding face 132 is not formed. Therefore, an amount of the outer diameter occupied by the conventional jumper wire is utilized as a coil winding space and thus the number of wound layers of the coil wire can be increased without increasing its outer diameter dimension. Further, since the coil wire is wound around regularly, the winding number of the coil wire can be increased without increasing its outer diameter dimension.

Especially in this embodiment, each of the numbers of layers of coil winding around the first coil winding face 131 and the second coil winding face 132 is eight or less and that is smaller. Therefore, when there is no jumper wire, the number of wound layers of the coil wire can be increased by one layer and, in this case, the number of wound layers can be increased 10% or more. Further, in this embodiment, since the wire diameter of the coil wire is very thin, i.e., in a range of 0.04-0.08 mm including insulation layer, when a jumper wire is formed, the coil wire may be easily disconnected. However, according to this embodiment, since there is no jumper wire, disconnection of the coil wire caused by the jumper wire does not occur during the coil wire is being wound around.

Further, the coil winding start part 136a and the coil winding end part 136b are located on opposite sides to each other. Therefore, in comparison with a case that the coil winding start part 136a and the coil winding end part 136b are adjacent to each other in the circumferential direction, symmetric property of the movable body 3 can be secured. Accordingly, the movable body 3 can be moved in the optical axis direction "L" in a stable posture without being inclined.

Figure 5:
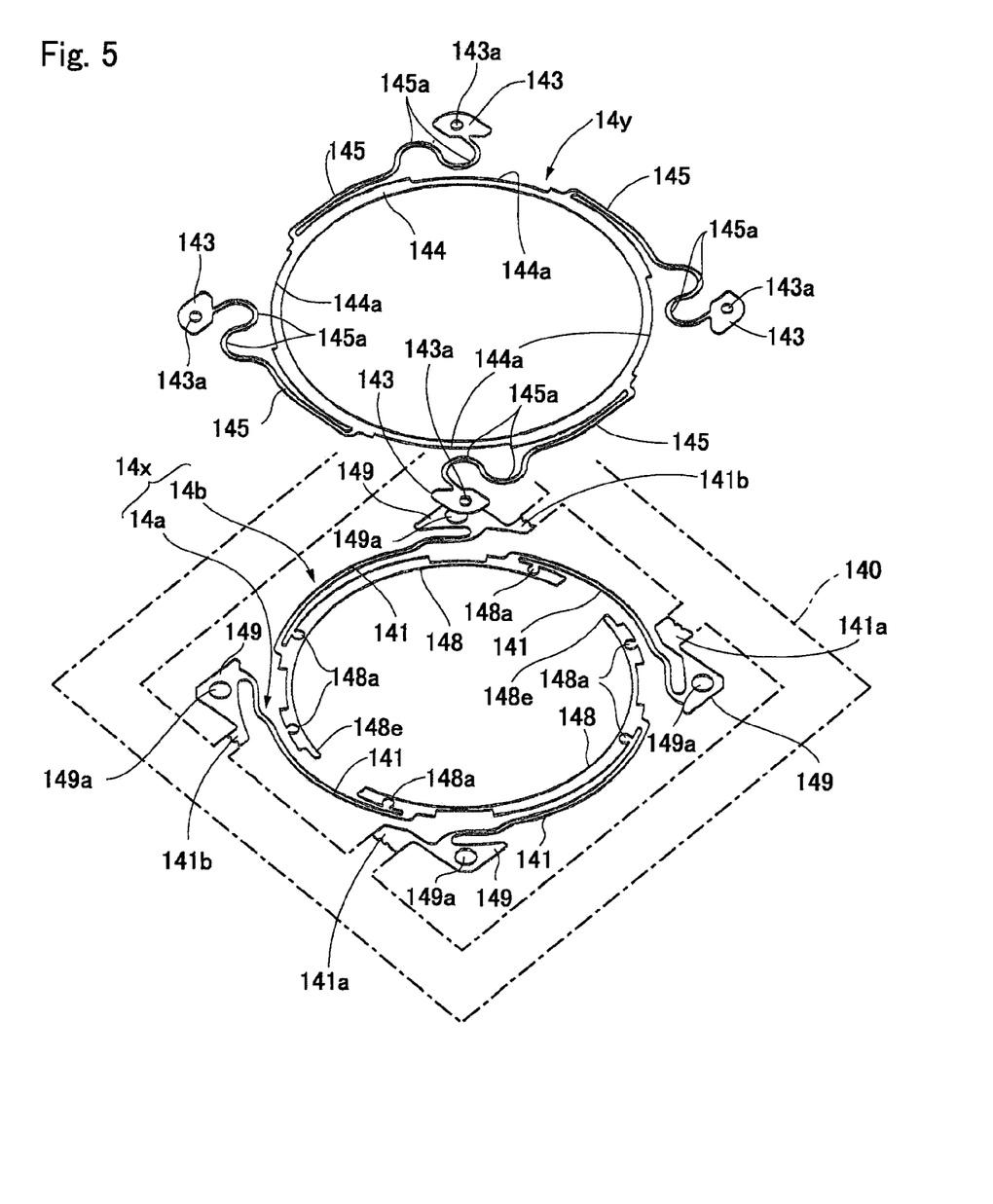
FIG. 5 is a perspective view showing a spring member (first spring member and second spring member) which is used in a lens drive device in accordance with an embodiment of the present invention.

With reference to FIG. 5, a structure of the spring member (first spring member 14x and second spring member 14y) will be described below which is used in the lens drive device to which the present invention is applied. FIG. 5 is a perspective view showing the first spring member 14x and the second spring member 14y which are used in the lens drive device 1 in accordance with an embodiment of the present invention.

In this embodiment, a spring force of the spring member is utilized. Therefore, the first spring member 14x and the second spring member 14y are required so that a longitudinal spring constant is constant in a wide deformation range in the lens optical axis direction "L", in other words, when the sleeve 13 is moved in the optical axis direction "L", spring forces generated in the first spring member 14x and the second spring member 14y are required to be constant. In addition, their lateral spring constants are required to be larger, in other words, when the movable body 3 is moved in the optical axis direction "L", the movable body 3 is not displaced in a direction perpendicular to the optical axis. However, it is difficult that both of the requirements are satisfied by using one kind of spring member. Therefore, in this embodiment, a following structure described below is utilized.

As shown in FIG. 5, the first spring member 14x on the imaging element side is provided with four support body side connecting parts 149, which are held by the support body 2 (holder 19), ring-shaped movable body side connecting parts 148, which are fixed to the movable body 3 (sleeve 13), and four flat spring-shaped arm parts 141 which connect the support body side connecting parts 149 with the movable body side connecting parts 148. The movable body side connecting part 148 is formed with a small opening 148a for connecting with a lower end part of the sleeve 13, and the support body side connecting part 149 is formed with a small opening 149a for connecting with the holder 19 at the corner portion of the holder 19 formed in a rectangular shape. In this embodiment, the arm part 141 is extended in a circular arc shape in the circumferential direction and is not provided with a meandering portion which is radially turned back.

The first spring member 14x is divided into two spring pieces 14a and 14b, which are utilized as a power supply member to the first coil 31 and the second coil 32. Therefore, both end parts (winding start part and winding end part) of one coil wire which structures the first coil 31 and the second coil 32 are connected with end parts 148e of the movable body side connecting parts 148 of two spring pieces 14a and 14b by a method such as soldering.

In this embodiment, the first spring member 14x is formed so that the spring pieces 14a and 14b are connected with each other through a frame part 140 as shown by the alternate long and short dash line during manufacturing and, at the time of the halfway of assembling to the lens drive device 1, the first spring member 14x is divided into two spring pieces 14a and 14b. Therefore, the spring pieces 14a and 14b are provided with cutting portions 141a and 141b from the frame part 140, and a width of the cut-off portion 141a is wider than that of the cutting portion 141b. The cut-off portions 141a having a wider width are utilized as a connected part with the terminals 12x and 12y at the time of soldering as described below.

The second spring member 14y on the object to be photographed side is provided with four support body side connecting parts 143, which is held by the support body 2 (spacer 11), a movable body side connecting part 144, which is formed in a circular ring and frame shape and is connected with an upper end of the sleeve 13, and four arm parts 145 which connect the support body side connecting parts 143 with the movable body side connecting part 144. These four arm parts 145 are respectively extended from connected portions with the movable body side connecting part 144 to the support body side connecting parts 143 through a meandering part 145a which is turned back while curving on an outer peripheral side. In this embodiment, the movable body side connecting part 144 is formed with cut-out parts 144a for connecting with the upper end part of the sleeve 13, and the support body side connecting part 143 is formed with a small opening 143a for connecting with the spacer 11.

As described above, in this embodiment, two spring members (first spring member 14x and second spring member 14y) are used. Therefore, the two spring members are structured to be different from each other to cope with the requirements to the spring member. In other words, in this embodiment, a first type of spring member is used as the first spring member 14x, which is extended in a circular arc shape in the circumferential direction and in which the arm part 141 is not provided with a meandering part. The first type of spring member is difficult to extend the arm part 141 further longer in order to set its longitudinal spring constant to be constant over a wide deformation range in the optical axis direction "L" but its lateral spring constant becomes larger. On the other hand, a second type of spring member is used as the second spring member 14y, in which the arm part 145 having the meandering part 145a is extended in the circumferential direction. The second type of spring member is provided with a small lateral spring constant but, since the arm part 145 is provided with the meandering part 145a, its longitudinal spring constant becomes constant over a wide deformation range in the lens optical axis direction "L". Therefore, according to this embodiment, both of the requirement of a large lateral spring constant and the requirement where a longitudinal spring constant is maintained to be constant over a wide range in the lens optical axis direction "L", which are not satisfied by one kind of spring member, is satisfied. Accordingly, since the lateral spring constant having a sufficient level is realized, the movable body 3 is prevented from displacing in side directions, and the longitudinal spring constant can be maintained to be constant over a wide moving range in the optical axis direction "L".

Further, in this embodiment, a first type of spring member having a large lateral spring constant is used as the first spring member 14x which is disposed on the imaging element side. Therefore, even when an external force in a direction perpendicular to the optical axis direction "L" is applied to the movable body 3, deterioration of image quality can be prevented. In other words, in the small lens drive device 1, when a shake occurs in the direction perpendicular to the optical axis on the imaging element side of the movable body 3 and is compared with a shake occurring in the direction perpendicular to the optical axis on the object to be photographed side of the movable body 3, the shake on the imaging element side more greatly affects the image quality than that the shake on the object side does. Thus, according to this embodiment, the first spring member 14x which is disposed on the imaging element side and which is more easily and greatly affected is provided with a larger lateral spring constant and thus effect to the image quality can be restrained and made smaller.

In this embodiment, the first spring member 14x and the second spring member 14y are formed in a substantially rotational symmetrical arrangement so that four arm parts are extended in the same circumferential direction. However, it may be structured that two of the four arm parts are formed in a linear symmetrical arrangement.

Figure 6A:
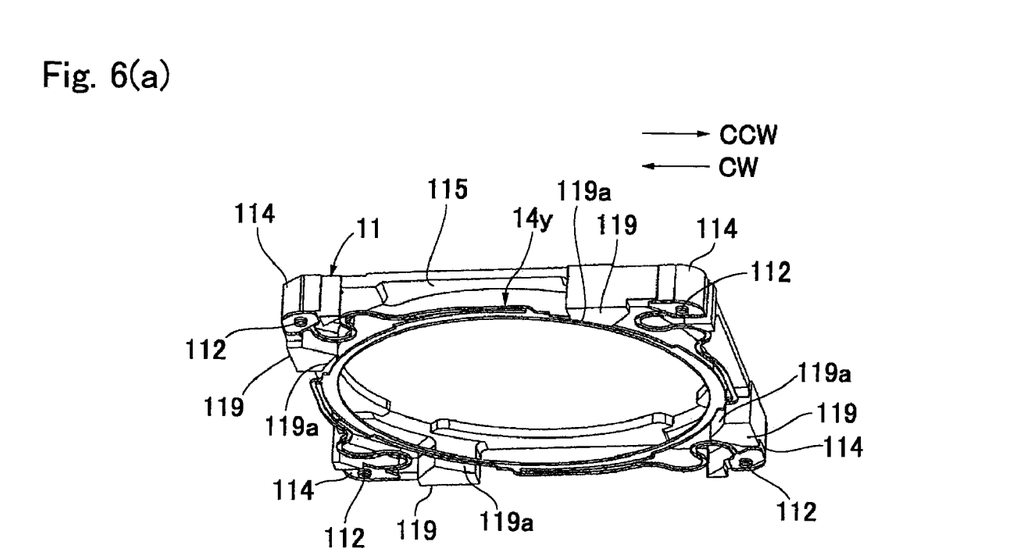
FIG. 6(a) is a perspective view showing a spacer used in a lens drive device in accordance with an embodiment of the present invention which is viewed from obliquely below.
Figure 6B:
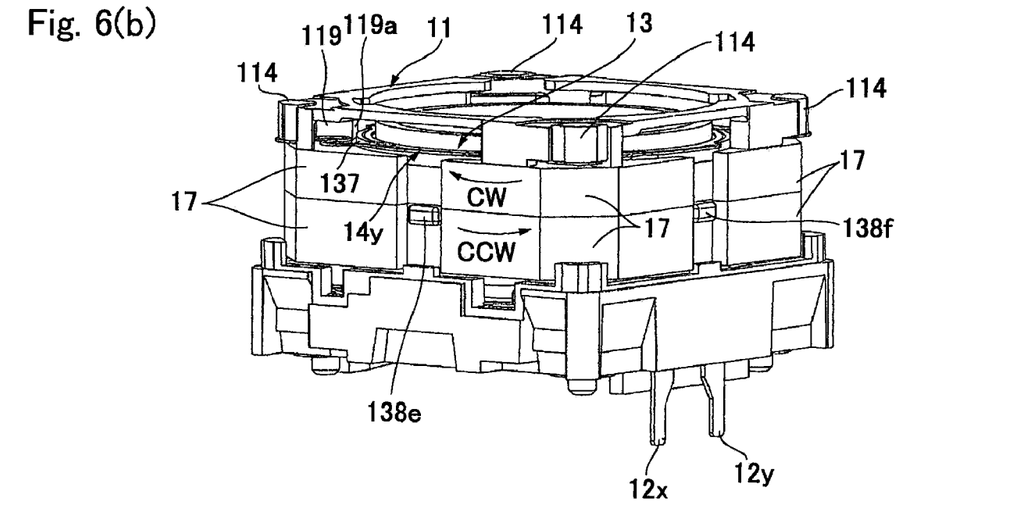
FIG. 6(b) is an explanatory view showing a positional relationship between a spacer and a sleeve.

FIG. 6(a) is a perspective view showing the spacer 11 used in the lens drive device 1 in accordance with an embodiment of the present invention which is viewed from obliquely below, and FIG. 6(b) is an explanatory view showing a positional relationship between the spacer 11 and the sleeve 13.

In this embodiment, a first type of spring member having a larger lateral spring constant is used as the first spring member 14x which is disposed on the imaging element side, and a second type of spring member having a smaller lateral spring constant is used as the second spring member 14y on the object to be photographed side. Therefore, the movable body 3 may be largely shaken in the radial direction on the object to be photographed side. Accordingly, in this embodiment, as described below, a clearance between the support body 2 and the movable body 3 in the radial direction is set to be larger on the object to be photographed side in comparison with the imaging element side.

In other words, a clearance "G1" (see FIG. 3) between the support body 2 and the movable body 3 on the imaging element side is determined by a gap space dimension in the radial direction between the projections 136e, 136f, 136g and 136h of the sleeve 13 shown in FIG. 3 and FIGS. 4(a) through 4(d) and an inner face of the side wall 191 of the holder 19. Further, a clearance "G2" (see FIG. 3) between the support body 2 and the movable body 3 in the intermediate portion between the imaging element side and the object to be photographed side is determined by a gap space dimension in the radial direction between the projections 138e, 138f, 138g and 138*h* of the sleeve 13 shown in FIG. 3 and FIGS. 4(*a*) through 4(*d*) and the inner faces of the side plate parts 181, 182, 183 and 184 of the yoke 18.

A clearance "G3" (see FIG. 3) between the support body 2 and the movable body 3 on the object to be photographed side is determined by a gap space dimension in the radial direction between the sleeve 13 and column-shaped protruded parts 119 of the spacer 11 protruded toward the imaging element side.

The structure of the clearance "G3" will be described in detail below with reference to FIGS. 6(*a*) and 6(*b*). As shown in FIGS. 6(*a*) and 6(*b*), small projections 112 are formed on the spring member fixing parts 114 having a larger wall thickness which are disposed at four corners of an under face part of the spacer 11. The small projections 112 are fitted into small openings 143*a* formed in the support body side connecting parts 143 of the second spring member 14*y*. The under face part of the spacer 11 is formed with the column-shaped protruded parts 119 protruded toward the imaging element side at positions in the clockwise direction CW near the spring member fixing parts 114 where the small projections 112 are formed. A lower end face of the column-shaped protruded part 119 is abutted with an end face of the magnet 17 on the object to be photographed side to position the magnet 17 between the holder 19 and the column-shaped protruded part 119.

In this embodiment, an inner side face 119*a* of the column-shaped protruded part 119 is formed in a curved face when viewed from the optical axis direction "L". On the other hand, an outer peripheral face of the rib-shaped protruded part 137 of the sleeve 13 formed in a ring shape faces the inner side face 119*a* of the column-shaped protruded part 119 on an inner side over a predetermined gap space in the radial direction. The clearance "G3" on the object to be photographed side between the support body 2 and the movable body 3 is determined by the gap space. Therefore, the column-shaped protruded part 119 functions as a moving restricting part for restricting movement in the radial direction of the movable body 3. As described above, in this embodiment, the spacer 11 is structured so that the spring member fixing part 114 for supporting the second spring member 14*y* is closely disposed to the column-shaped protruded part 119 for restricting movement in the radial direction of the movable body 3.

The clearances "G1", "G2" and "G3" are set to be the following relationship: G1≦G2<G3. The clearance in the radial direction between the support body 2 and the movable body 3 is set to be larger on the object to be photographed side than that on the imaging element side. Therefore, even when the object to be photographed side of the movable body 3 is shaken in the direction perpendicular to the optical axis, an unnecessary interference is not occurred between the movable body 3 and the support body 2.

Further, in this embodiment, the clearances "G1", "G2" and "G3" are set in dimensions so that, when the movable body 3 is moved with respect to the support body 2, the first spring member 14*x* and the second spring member 14*y* do not contact with the magnets 17 and the movable body 3. Therefore, even when the movable body 3 is shaken in the direction perpendicular to the optical axis, the first spring member 14*x* and the second spring member 14*y* are not interfered with the magnets 17, the support body 2 and the movable body 3. Therefore, damage such as plastic deformation of the first spring member 14*x* and the second spring member 14*y* can be prevented surely.

Further, the column-shaped protruded part 119 is protruded toward the imaging element side from the under face of the spacer 11 to provide a function positioning the magnets 17 between the holder 19 and the column-shaped protruded part 119. In addition, the column-shaped protruded part 119 is provided with a sufficient protruding dimension toward the imaging element side from the under face of the spacer 11. In other words, when the movable body 3 is located at the nearest position to the imaging element, the outer peripheral face of the rib-shaped protruded part 137 of the sleeve 13 faces the lower end part of the inner side face 119*a* of the column-shaped protruded part 119. Therefore, even when the movable body 3 is moved to any position in the optical axis direction "L", the outer peripheral face of the rib-shaped protruded part 137 of the sleeve 13 faces the inner side face 119*a* of the column-shaped protruded part 119. Accordingly, even when the movable body 3 is moved to any position in the optical axis direction "L", movement in the radial direction of the movable body 3 is restricted by the spacer 11. In addition, the spring member fixing part 114 and the column-shaped protruded part 119 of the spacer 11 are closely disposed each other and thus the second spring member 14*y* always provide a desired spring characteristic. In other words, in order to cause the second spring member 14*y* to provide a desired spring characteristic, it is important that deformation is prevented at a portion near the connecting portion of the second spring member 14*y* with the support body 2 (spacer 11). According to this embodiment, since the spring member fixing part 114 and the column-shaped protruded part 119 are disposed in the vicinity to each other, deformation is surely prevented at a portion near the connecting portion of the second spring member 14*y* with the support body 2 (spacer 11). Especially, in this embodiment, the portion near the connecting portion of the second spring member 14*y* with the support body 2 (spacer 11) is formed with the S-shaped meandering part 145*a* and the magnet 17 is disposed its vicinity. However, the spring member fixing part 114 and the column-shaped protruded part 119 are disposed in the vicinity to each other and thus, even when the movable body 3 is displaced in the radial direction, abutting of the meandering part 145*a* of the second spring member 14*y* with the magnet 17 can be prevented surely.

Further, in this embodiment, the projections 138*e* through 138*h* which are formed on the outer peripheral face of the sleeve 13 are located between four magnets 17 disposed in the circumferential direction. Further, the projections 136*e* through 136*h* which are formed on the outer peripheral face of the sleeve 13 are located on the inner sides of the recessed parts 191*a* which are formed on the inner face of the side wall parts 191 of the holder 19. Therefore, when the movable body 3 is displaced due to impact or the like in the direction perpendicular to the optical axis direction "L" (radial direction or circumferential direction), the projections 138*e* through 138*h* are abutted with the magnets 17 to function as a projecting part for interference and the projections 138*e* through 138*h* perform a rotation range restriction and a moving restriction in the radial direction of the movable body 3. Further, when the movable body 3 is displaced due to impact or the like in the direction perpendicular to the optical axis direction "L" (radial direction), the projections 136*e* through 136*h* are abutted with the side wall part 191 of the holder 19 to function also as a projecting part for interference and the projections 136*e* through 136*h* perform a moving restriction in the radial direction of the movable body 3. Moreover, even when the movable body 3 is moved to any position in the optical axis direction "L", the projecting parts for interference comprised of the projections 136*e* through 136*h* and 138*e* through 138*h* are abutted with the side wall part 191 of the holder 19 and the magnets 17 when the movable body 3 is displaced in direction perpendicular to the optical axis direction "L" due to an impact or the like. Accordingly, even when the movable body 3 is moved to any position in the optical axis direction "L", displacement in the radial direction of the movable body 3 can be prevented surely.

Figure 7:
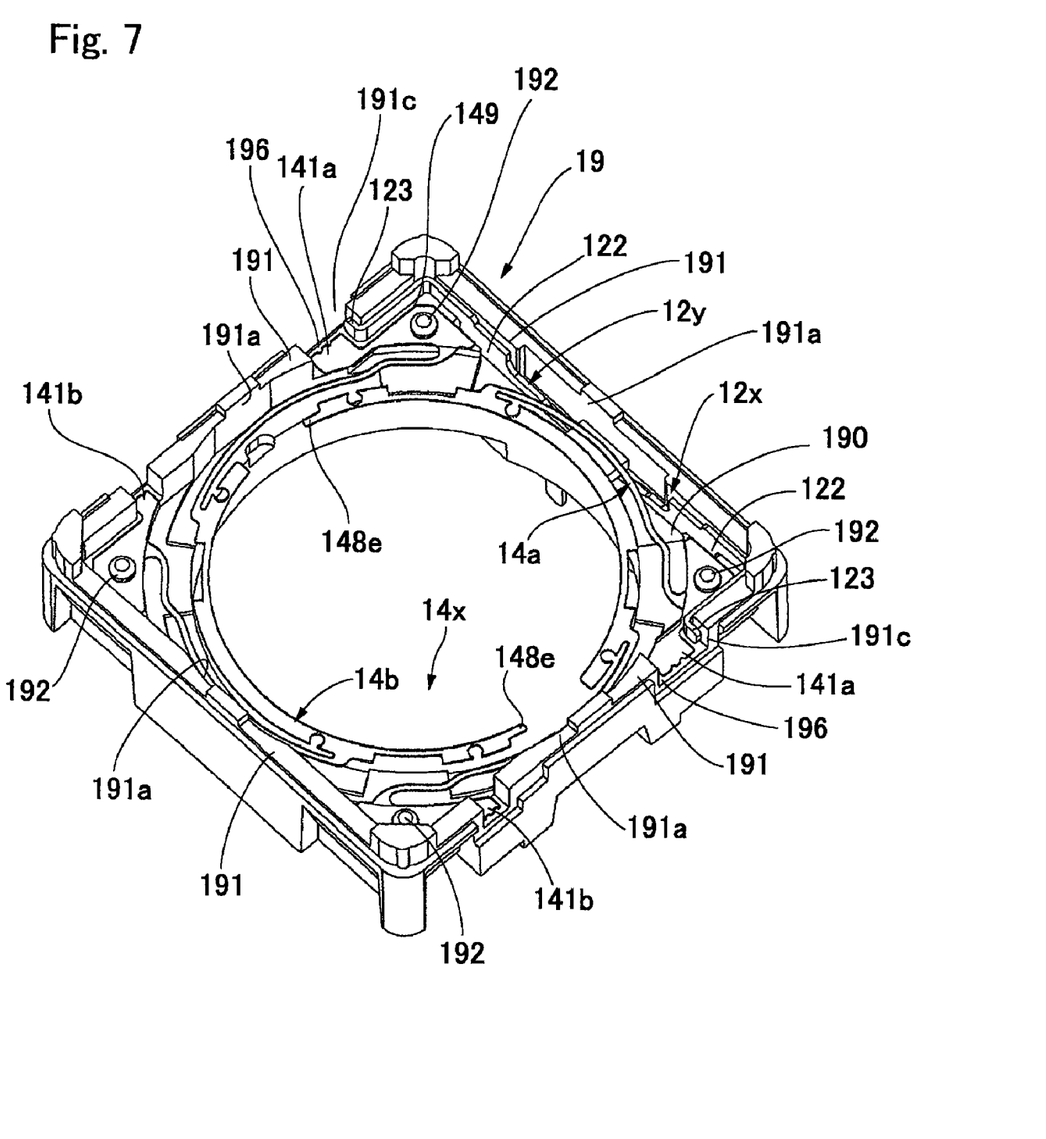
FIG. 7 is a perspective view showing a state where terminals and a first spring member are mounted on a holder in a lens drive device in accordance with an embodiment of the present invention.
Figure 8:
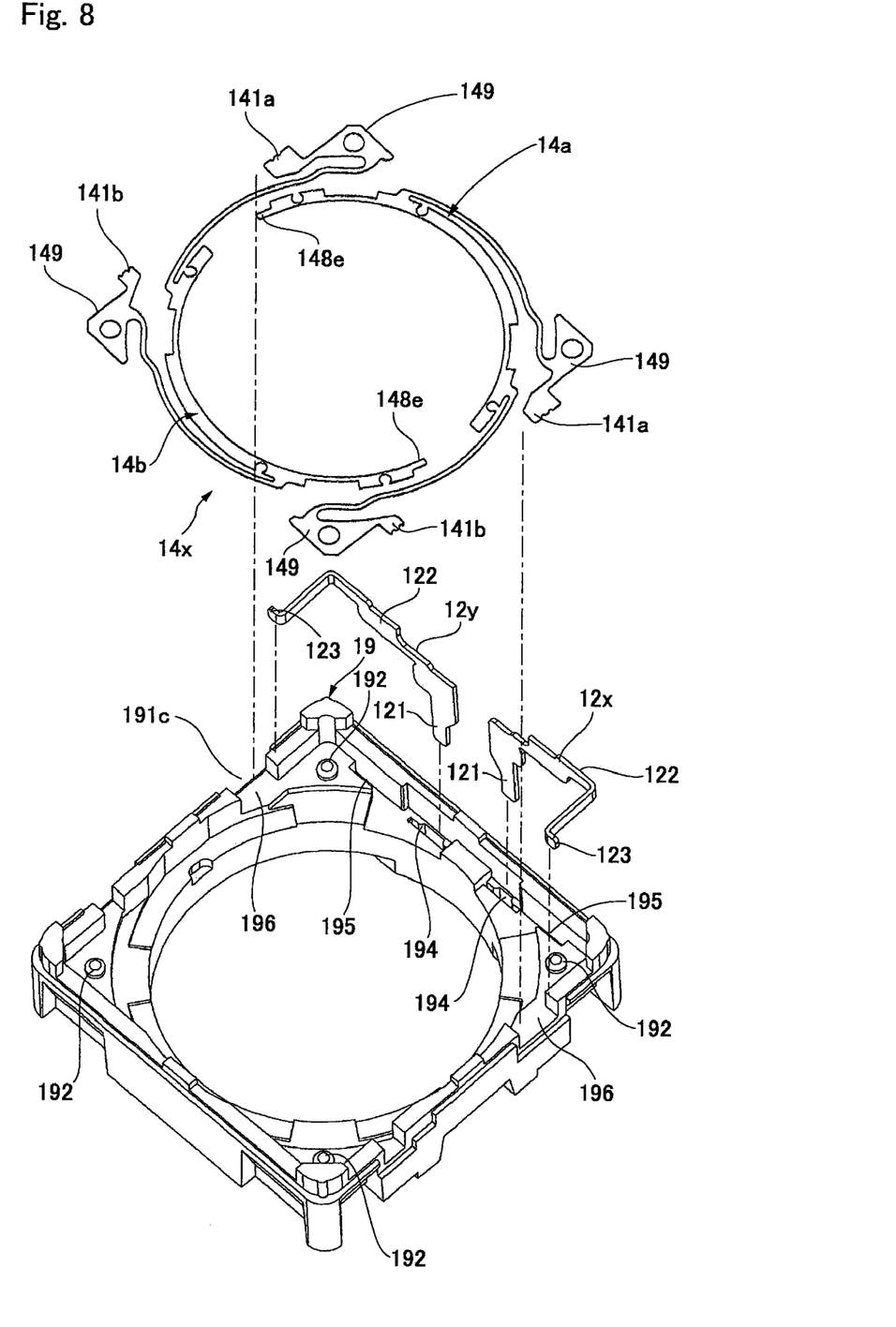
FIG. 8 is a perspective view showing a state where a holder, terminals and a first spring member are separated from each other in a lens drive device in accordance with an embodiment of the present invention.

FIG. 7 is a perspective view showing a state where terminals 12x and 12y and the first spring member 14x are mounted on the holder 19 in the lens drive device 1 in accordance with an embodiment of the present invention. FIG. 8 is a perspective view showing a state where the holder 19, terminals 12x and 12y and the first spring member 14x are separated from each other in the lens drive device 1 in accordance with an embodiment of the present invention.

In this embodiment, in order to supply an electric current to the first coil 31 and the second coil 32, both end parts of the coil wire (winding start part and winding end part) are connected with the end parts 148e of the spring pieces 14a and 14b shown in FIGS. 7 and 8 by a method such as soldering and terminals 12x and 12y separated from the spring pieces 14a and 14b are used.

The terminals 12x and 12y are provided with an outside connecting terminal part 121, which is located on an outer side of the holder 19 (insulation member), an inside connecting terminal part 123, which is electrically connected with the cut-off portions 141a (connected part) of the spring pieces 14a and 14b, and an elongated connecting part 122 which is extended from the outside connecting terminal part 121 along the side wall part 191 (inner wall) of the holder 19 to the inside connecting terminal part 123. The outside connecting terminal parts 121 are portions of the terminals 12x and 12y which are extended downward from one end part of the elongated connecting parts 122. The inside connecting terminal parts 123 are tip end parts of the elongated connecting parts 122 which are extended along the side wall part 191 of the holder 19 and bent at two positions so as to avoid the fixing part of the support body side connecting part 149 of the first spring member 14x (spring pieces 14a and 14b) to the small projection 192 formed at the corner part of the holder 19. The terminals 12x and 12y structured as described above are a metal plate which is performed with punching and bending by using press working or the like and held by the holder 19 in the state where their face directions are directed to the optical axis direction "L", in other words, in the state where their thickness directions are directed in the radial direction.

A through hole 194 through which the outside connecting terminal part 121 is penetrated from the inside of the holder 19 to the outside is formed at an angular portion where the bottom wall part 190 and the side wall part 191 are adjacently disposed to each other at a center portion in the circumferential direction of one side face part of the rectangular holder 19. Further, a cut-out part 191c is formed at a position where the inside connecting terminal part 123 is located in the side wall part 191 of the holder 19, i.e., in the side face part adjacent to the side face part where the through hole 194 is formed, so as to interpose the fixing part of the support body side connecting part 149 of the first spring member 14x (spring pieces 14a and 14b) to the small projection 192 of the holder 19 between the through hole 194 and the cut-out part 191c. The bottom plate part 190 of the holder 19 is formed with a flat seat part 196 at a portion corresponding to the cut-out part 191c, and the cutting portions 141a of the spring pieces 14a and 14b are placed on the upper faces of the seat parts 196. The seat part 196 is extended to the vicinity of the adjacent side wall part 191, and a slit-shaped groove 195 is formed in the side face part where the through hole 194 is formed between the end part of the seat part 196 and the side wall part 191. Therefore, in the state that the elongated connecting parts 122 of the terminals 12x and 12y are inserted into the grooves 195, the terminals 12x and 12y are fixed to the holder 19. In this embodiment, the outside connecting terminal parts 121 of the terminals 12x and 12y are press-fitted into the through holes 194 of the holder 19, and the elongated connecting parts 122 of the terminals 12x and 12y are press-fitted into the grooves 195 of the holder 19. Therefore, the terminals 12x and 12y are easily and surely fixed to the holder 19.

As described above, when the terminals 12x and 12y are fixed to the holder 19 and the cut-off portions 141a of the spring pieces 14a and 14b are placed on the seat parts 196, the inside connecting terminal parts 123 and the cut-off portions 141a of the spring pieces 14a and 14b are disposed in a posture where their faces are perpendicular to each other. Further, the inside connecting terminal parts 123 and the cut-off portions 141a of the spring pieces 14a and 14b are disposed in the state having a narrow gap space between them in the optical axis direction "L". In this state, faces of the inside connecting terminal parts 123 are soldered with faces of the cut-off portions 141a of the spring pieces 14a and 14b. In this case, a soldering iron is inserted from the outside through the cut-out part 191c.

As described above, in this embodiment, the spring pieces 14a and 14b and the terminals 12x and 12y are formed to be separated from each other and thus, even when the terminals 12x and 12y are provided with a bent portion, the spring pieces 14a and 14b are not deformed due to the terminals 12x and 12y. Further, even when an external force is applied to the outside connecting terminal part 121, the terminals 12x and 12y are provided with a long elongated connecting part 122 and thus the external force is not transmitted to spring portions of the spring pieces 14a and 14b. Therefore, the spring portions of the spring pieces 14a and 14b are surely prevented from being deformed by an external force. Accordingly, variation of spring constant due to deformation of the spring members 14x and 14y is prevented and thus driving of the movable body 3 which utilizes a thrust force by the magnetic drive mechanism 5 and urging forces of the spring members 14x and 14y can be performed satisfactory. In addition, the elongated connecting part 122 is extended along the inner wall of the holder 19. Therefore, even when the elongated connecting part 122 is made longer, a malfunction such as contact of the elongated connecting part 122 with the spring pieces 14a and 14b does not occur.

Further, the outside connecting terminal parts 121 of the terminals 12x and 12y are penetrated through the through holes 194 of the holder 19 to be drawn outside. Therefore, since the outside connecting terminal part 121 is drawn outside by utilizing a thick wall portion of the holder 19, the size of the lens drive device 1 is reduced in comparison with a structure that the outside connecting terminal part 121 is drawn outside along the outer face of the holder 19.

In addition, since the outside connecting terminal part 121 is press-fitted into the through hole 194, even when an external force is applied to the outside connecting terminal part 121, the external force is not transmitted to the spring pieces 14a and 14b. Further, since the elongated connecting parts 122 of the terminals 12x and 12y are press-fitted into the grooves 195 formed in a slit-like shape, the elongated connecting parts 122 are fixed firmly. Therefore, even when an external force is applied to the outside connecting terminal part 121, the external force is not transmitted to the spring pieces 14a and 14b. Accordingly, deformation of the spring pieces 14a and 14b due to the external force can be prevented surely.

Further, in this embodiment, the cut-off portions 141a of the spring pieces 14a and 14b are placed on the seat parts 196. Further, the cut-off portion 141a having a wider width than the cut-off portion 141b of the spring pieces 14a and 14b is utilized as a connected part of the terminals 12x and 12y. Therefore, soldering work is easily performed and soldering itself is performed surely.

In addition, the cut-off portions 141a of the spring pieces 14a and 14b and the inside connecting terminal parts 123 of the terminals 12x and 12y are connected with each other so that their faces perpendicular to each other are soldered. Therefore, even when a region where soldering is occupied is narrow on a plane, a sufficiently larger soldering area can be secured on both of the spring pieces 14a and 14b and the terminals 12x and 12y. Further, a gap space in the optical axis direction "L" is secured between the cut-off portions 141a of the spring pieces 14a and 14b and the inside connecting terminal parts 123 of the terminals 12x and 12y, and the gap space is filled with solder. Therefore, a fillet in an appropriate shape can be formed on the soldering portion and the solder does not spread excessively.

In addition, the structure that the outside connecting terminal part 121 is press-fitted into the through hole 194 and the elongated connecting part 122 is press-fitted into the groove 195 formed in a slit-like shape may be applied to a structure that the terminals 12x and 12y are formed as a part of the spring members 14x and 14y. Also in this case, an external force which is applied to the outside connecting terminal part 121 is prevented from being transmitted to the spring portions of the spring pieces 14a and 14b.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic device comprising:
    a coil wound body which is formed on an outer peripheral face with a first coil winding face and a second coil winding face that is adjacent to the first coil winding face in an axial direction;
    a coil which is wound around the first coil winding face and the second coil winding face; and
    a coil winding start part and a coil winding end part which are arranged on an opposite side to the second coil winding face with respect to the first coil winding face;
    wherein the coil is wound around the first coil winding face by an odd number of layer(s) from the winding start part and then the coil is wound around the second coil winding face by an even number of layers in a reverse direction to the first coil winding face, and then the coil is wound around the first coil winding face by an odd number of layer(s) in a reverse direction to the second coil winding face and then the coil is drawn outside from the coil winding end part.

2. The magnetic device according to claim 1, further comprising a coil engaging part which is formed between the first coil winding face and the second coil winding face for turning a winding direction of the coil in a reverse direction,
    wherein the coil is regularly wound around the first coil winding face and the second coil winding face.

3. The magnetic device according to claim 2, further comprising a protruded part which is formed in a rib-like shape for dividing the outer peripheral face of the coil wound body into the first coil winding face and the second coil winding face,
    wherein the coil engaging part is an end part of a cut-out portion which is formed in the protruded part.

4. The magnetic device according to claim 3, wherein
    an outer diameter dimension of the first coil winding face is different from an outer diameter dimension of the second coil winding face, and
    a winding face of one of the first coil winding face and the second coil winding face whose outer diameter dimension is smaller is provided with a larger number of layers of coil winding than a winding face of other of the first coil winding face and the second coil winding face whose outer diameter dimension is larger.

5. The magnetic device according to claim 4, wherein the winding face whose outer diameter dimension is smaller is provided with a larger number of layers of coil winding than the winding face whose outer diameter dimension is larger so that the larger number of layers corresponds to a difference of the outer diameter dimensions.

6. The magnetic device according to claim 3, further comprising
    a movable body which includes the coil wound body and which is driven in the axial direction, and
    a support body which is disposed on an outer side of the coil wound body for supporting the coil wound body to be capable of moving in the axial direction,
    wherein the protruded part is formed also as an interference projecting part to the support body for restricting at least one of a turning range of the movable body and a moving range of the movable body in a direction perpendicular to the axial direction.

7. The magnetic device according to claim 1, wherein
    an outer diameter dimension of the first coil winding face is different from an outer diameter dimension of the second coil winding face,
    in the first coil winding face and the second coil winding face, a length in the axial direction of a winding face whose outer diameter dimension is larger is set to be longer than a length in the axial direction of a winding face whose outer diameter dimension is smaller, and
    the winding face whose outer diameter dimension is smaller is provided with a larger number of layers of coil winding than the winding face whose outer diameter dimension is larger.

8. The magnetic device according to claim 7, wherein a number of layers of coil winding of the winding face whose outer diameter dimension is smaller is determined according to a difference of the outer diameter dimensions and a difference of the lengths in the axial direction of the winding faces.

9. The magnetic device according to claim 1, wherein both of a number of layers of coil winding around the first coil winding face and a number of layers of coil winding around the second coil winding face are eight or less.

10. The magnetic device according to claim 1, wherein a diameter of a coil wire of the coil is in a range from 0.04 mm to 0.08 mm including insulation layer.

11. The magnetic device according to claim 1, wherein the coil winding start part and the coil winding end part are located on opposite sides to each other in the coil wound body so as to interpose an axial line between the coil winding start part and the coil winding end part.

12. A lens drive device comprising:
    a support body;
    a movable body which comprises a lens; and
    a magnetic drive mechanism which comprises a magnet on the support body and a coil on the movable body for magnetically driving the movable body along a lens optical axis direction toward an object to be photographed side and toward an opposite side to the object to be photographed side;

wherein the movable body is formed on an outer peripheral face with a first coil winding face and a second coil winding face which is adjacent to the first coil winding face in an axial direction, the movable body comprises a coil which is wound around the first coil winding face and the second coil winding face, and the movable body comprises a coil winding start part and a coil winding end part which are arranged on the opposite side to the object to be photographed side with respect to the first coil winding face, and wherein the coil is wound around the first coil winding face by an odd number of layer(s) from the winding start part and then the coil is wound around the second coil winding face by an even number of layers in a reverse direction to the first coil winding face, and then the coil is wound around the first coil winding face by an odd number of layer(s) in a reverse direction to the second coil winding face and then the coil is drawn outside from the coil winding end part.

13. The lens drive device according to claim 12, further comprising a spring member which is disposed on the opposite side to the object to be photographed side with respect to the first coil winding face and which is connected with the support body and the movable body, wherein the spring member comprises a plurality of spring pieces which are electrically separated from each other, and the coil winding start part and the coil winding end part are electrically connected with different spring pieces from each other.

14. The lens drive device according to claim 12, wherein the magnetic drive mechanism comprises a first coil which is wound around the first coil winding face, a second coil which is wound around the second coil winding face, and two magnets which are divided in an optical axis direction so as to face outer peripheral sides of the first coil and the second coil, and the two magnets are magnetized so that poles of inner faces are different from each other.

15. The lens drive device according to claim 14, further comprising a coil engaging part which is formed between the first coil winding face and the second coil winding face for turning a winding direction of the coil in a reverse direction, wherein the coil is regularly wound around the first coil winding face and the second coil winding face.

16. The lens drive device according to claim 15, wherein the support body comprises a yoke which is formed in a substantially rectangular parallelepiped shape, and the magnets divided in the optical axis direction are fixed to four corner portions on an inner peripheral face of the yoke in a separated state in a circumferential direction.

17. The lens drive device according to claim 15, wherein an outer diameter dimension of the first coil winding face is different from an outer diameter dimension of the second coil winding face, in the first coil winding face and the second coil winding face, a length in the axial direction of a winding face whose outer diameter dimension is larger is set to be longer than a length in the axial direction of a winding face whose outer diameter dimension is smaller, and the winding face whose outer diameter dimension is smaller is provided with a larger number of layers of coil winding than the winding face whose outer diameter dimension is larger.

18. The lens drive device according to claim 17, wherein a number of layers of coil winding of the winding face whose outer diameter dimension is smaller is determined according to a difference of the outer diameter dimensions and a difference of the lengths in the axial direction of the winding faces.

19. The lens drive device according to claim 18, wherein the movable body comprises a plurality of lenses, a diameter of a lens disposed on a first coil winding face side is larger than a diameter of another lens, and an outer diameter dimension of the first coil winding face is set to be larger than the second coil winding face.

20. The lens drive device according to claim 12, wherein both of a number of layers of coil winding around the first coil winding face and a number of layers of coil winding around the second coil winding face are eight or less.

* * * * *